United States Patent
Kim et al.

(10) Patent No.: US 9,203,457 B2
(45) Date of Patent: Dec. 1, 2015

(54) METHOD FOR TERMINAL TRANSMITTING/RECEIVING SIGNAL IN BASE STATION COORDINATION WIRELESS COMMUNICATION SYSTEM, AND APPARATUS FOR SAME

(75) Inventors: Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 14/123,033

(22) PCT Filed: Jun. 25, 2012

(86) PCT No.: PCT/KR2012/004980
§ 371 (c)(1),
(2), (4) Date: Nov. 27, 2013

(87) PCT Pub. No.: WO2012/177094
PCT Pub. Date: Dec. 27, 2012

(65) Prior Publication Data
US 2014/0080477 A1    Mar. 20, 2014

Related U.S. Application Data

(60) Provisional application No. 61/500,600, filed on Jun. 23, 2011.

(51) Int. Cl.
*H04B 1/38* (2015.01)
*H04L 5/00* (2006.01)

(52) U.S. Cl.
CPC *H04B 1/38* (2013.01); *H04L 5/001* (2013.01); *H04L 5/0053* (2013.01); *H04L 5/0098* (2013.01)

(58) Field of Classification Search
CPC .................................. H04L 5/001; H04B 1/38
USPC ............... 455/422.1, 509; 370/252, 241, 329
See application file for complete search history.

(56) References Cited

U.S. PATENT DOCUMENTS

| | | | |
|---|---|---|---|
| 2009/0092091 A1* | 4/2009 | Balasubramanian | 370/329 |
| 2011/0086659 A1* | 4/2011 | Yoon et al. | 455/509 |
| 2011/0267957 A1* | 11/2011 | Du et al. | 370/241 |
| 2012/0051306 A1 | 3/2012 | Chung et al. | |
| 2012/0057490 A1* | 3/2012 | Park et al. | 370/252 |

FOREIGN PATENT DOCUMENTS

| | | | |
|---|---|---|---|
| KR | 10-2010-0032813 A | | 3/2010 |
| KR | 10-2010-0118067 A | | 11/2010 |
| KR | 10-2011-0040672 A | | 4/2011 |
| WO | WO 2010/123257 A2 | | 10/2010 |

* cited by examiner

*Primary Examiner* — Jinsong Hu
*Assistant Examiner* — Jean Chang
(74) *Attorney, Agent, or Firm* — Birch, Stewart, Kolasch & Birch, LLP

(57) ABSTRACT

In the present invention, a method for a terminal transmitting/receiving a signal with a plurality of transmission points in a wireless communication system is disclosed. More particularly, the method comprises the steps of: receiving carrier aggregation (CA) setting information and a signal related to a fake-carrier aggregation (CA) for applying the CA settings from a main transmission point from the transmission points; and transmitting the signal through each of the plurality of transmission points and a single carrier, wherein the information included in the fake-CA signal includes information related to whether to activate an uplink and a downlink of each of the plurality of transmission points.

10 Claims, 11 Drawing Sheets

FIG. 2
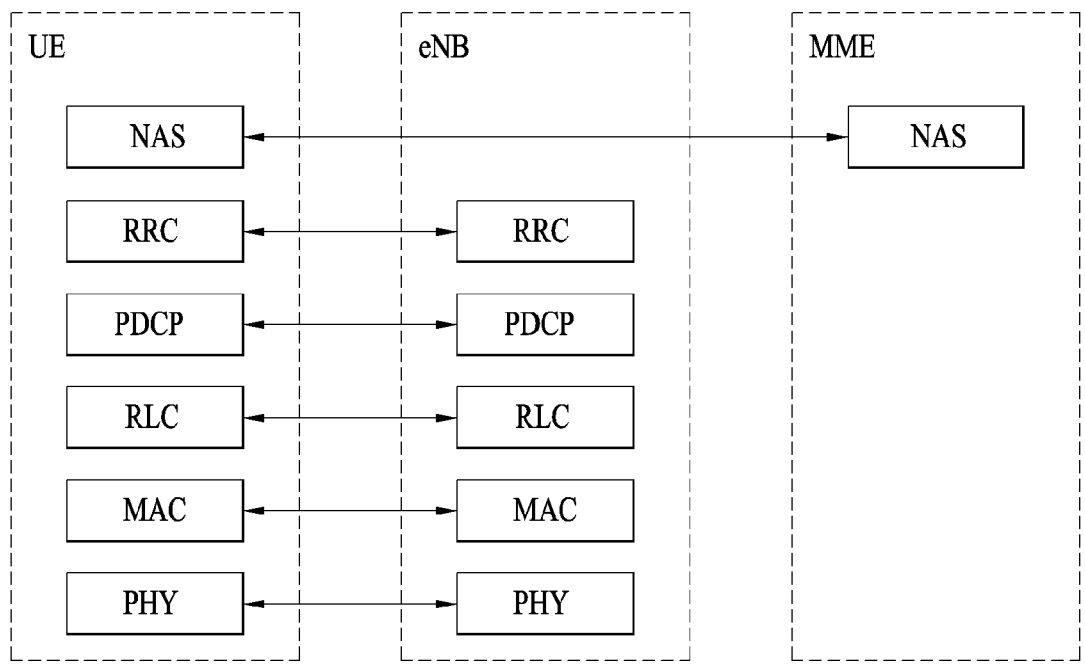
(a) control plane protocol stack
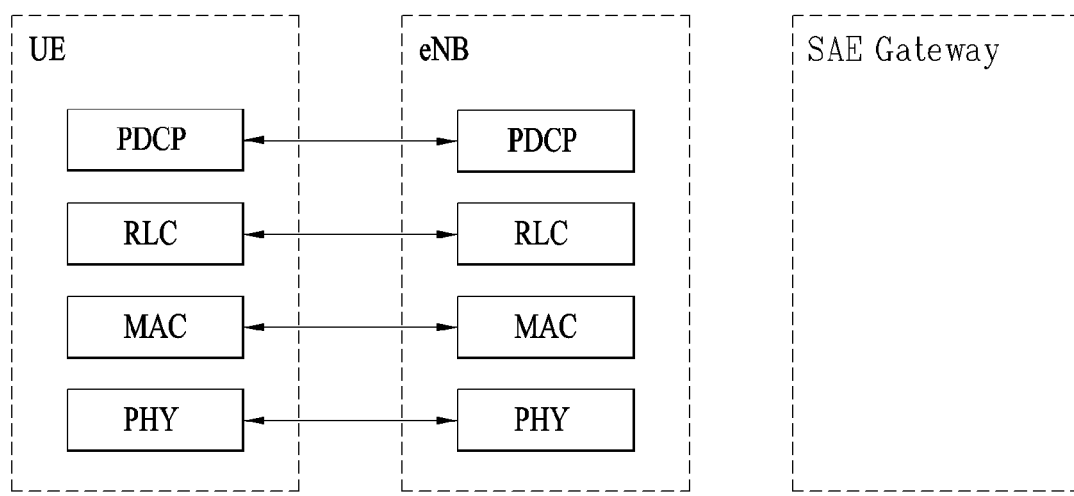
(b) user plane protocol stack METHOD FOR TERMINAL
TRANSMITTING/RECEIVING SIGNAL IN
BASE STATION COORDINATION WIRELESS
COMMUNICATION SYSTEM, AND
APPARATUS FOR SAME

CROSS REFERENCE TO RELATED
APPLICATIONS

This application is the National Phase of PCT/KR2012/ 004980 filed on Jun. 25, 2012, which claims priority under 35 U.S.C. 119(e) to U.S. Provisional Application No. 61/500, 600 filed on Jun. 23, 2011, all of which are hereby expressly incorporated by reference into the present application.

TECHNICAL FIELD

The present invention relates to a wireless communication system, and more particularly, to a method of transmitting/ receiving a signal, which is transmitted/received by a user equipment in an eNode B coordination wireless communication system and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of transmitting/receiving a signal, which is transmitted/received by a user equipment in an eNode B coordination wireless communication system and an apparatus therefor in the following description based on the discussion mentioned earlier in the foregoing description.

Technical Solution

To achieve these and other advantages and in accordance with the purpose of the present invention, as embodied and broadly described, according to one embodiment, a method of transceiving a signal with a plurality of transmission points, which is transceived by a user equipment in a wireless communication system includes the steps of receiving CA (carrier aggregation) configuration information and a fake-CA (carrier aggregation) related signal from a primary transmission point among a plurality of the transmission points and transceiving a signal with each of a plurality of the transmission points via a single carrier according to information included in the fake-CA related signal, wherein the information included in the fake-CA related signal includes information on whether an uplink and a downlink of each of a plurality of the transmission points are activated.

Preferably, the fake-CA related signal includes information indicating that a downlink signal is not transmitted in different transmission points except a specific transmission point among a plurality of the transmission points and/or information indicating that an uplink signal transmission is not scheduled in different transmission points except a specific transmission point among a plurality of the transmission points.

Moreover, if the specific transmission point corresponds to a neighboring cell, the method further include the step of estimating a timing synchronization to transmit an uplink signal to the neighboring cell using a downlink signal received from the neighboring cell to perform RRM (radio resource management).

More preferably, the fake-CA related signal is received via an upper layer signaling.

To further achieve these and other advantages and in accordance with the purpose of the present invention, according to a different embodiment, a user equipment in a wireless communication system includes a radio communication module configured to transceive a signal with a plurality of transmission points and a processor configured to process the signal, the processor configured to receive CA (carrier aggregation)

configuration information and a fake-CA (carrier aggregation) related signal from a primary transmission point among a plurality of the transmission points, the processor configured to control the radio communication module to transceive a signal with each of a plurality of the transmission points via a single carrier according to information included in the fake-CA related signal, wherein the information included in the fake-CA related signal includes information on whether an uplink and a downlink of each of a plurality of the transmission points are activated.

Advantageous Effects

According to embodiment of the present invention, a user equipment can efficiently transceive a signal with a plurality of eNode Bs in an eNode B coordination wireless communication system although the user equipment does not have a carrier aggregation capability.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram for structures of control and user planes of radio interface protocol between a 3GPP radio access network standard-based user equipment and E-UTRAN;

BEST MODE

Mode for Invention

Figure 1:
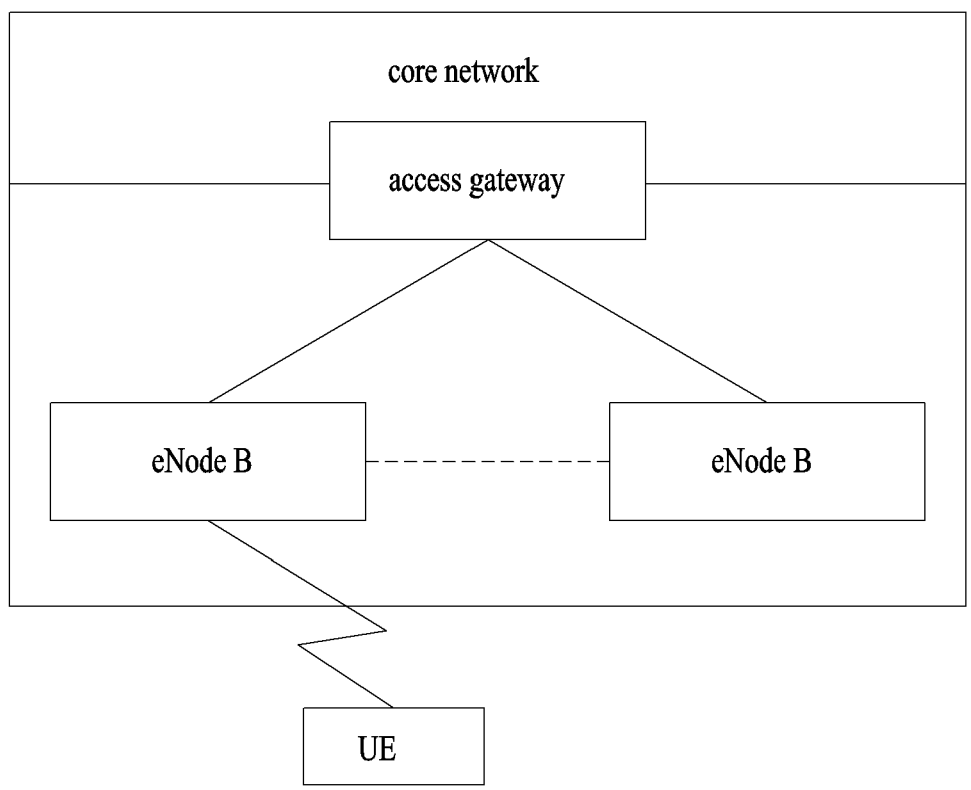
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
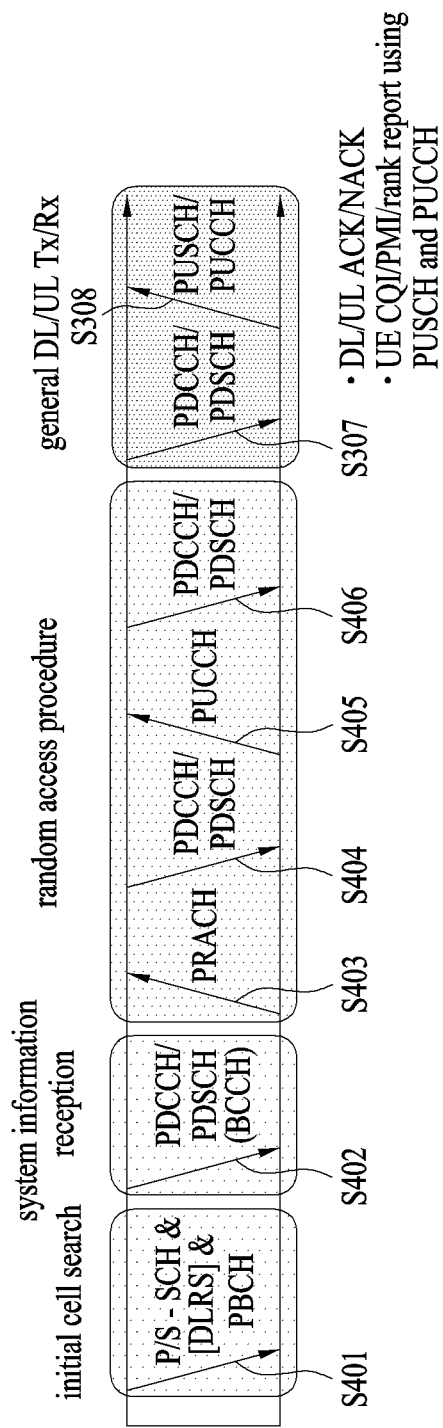
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
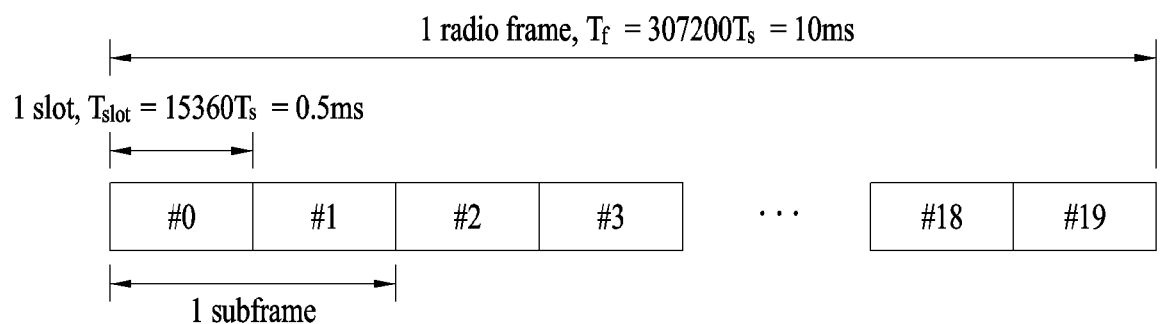
FIG. 4 is a diagram for a structure of a radio frame in LTE system.

FIG. 4 is a diagram for a structure of a radio frame used in an LTE system.

Referring to FIG. 4, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_S$ indicates a sampling time and is represented as $T_S=1/(15\ kHz \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
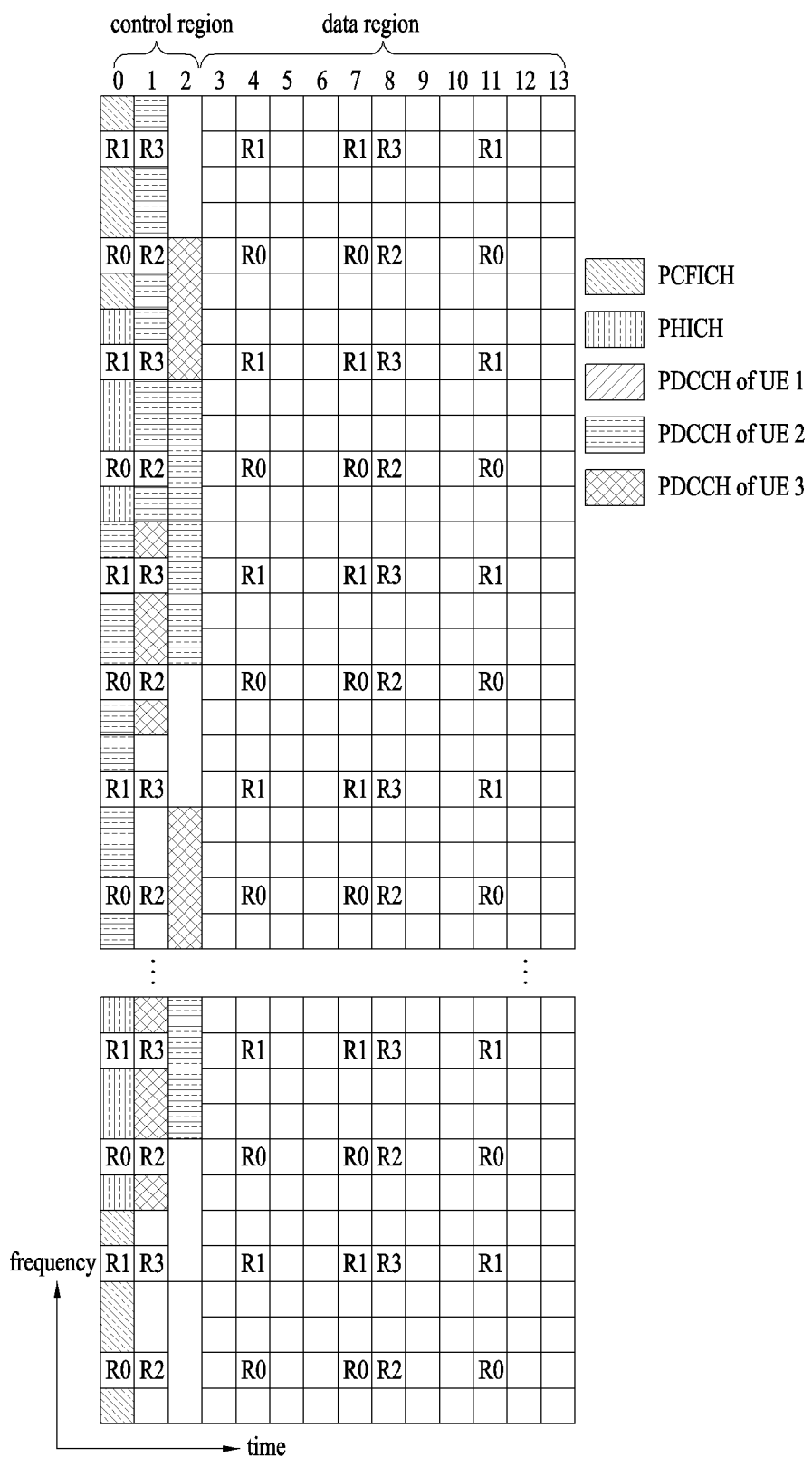
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH) and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information indicating which user equipment (one or a plurality of user equipments) receives data of PDSCH and how a plurality of the user equipments receive and decode the PDSCH data and the like are transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
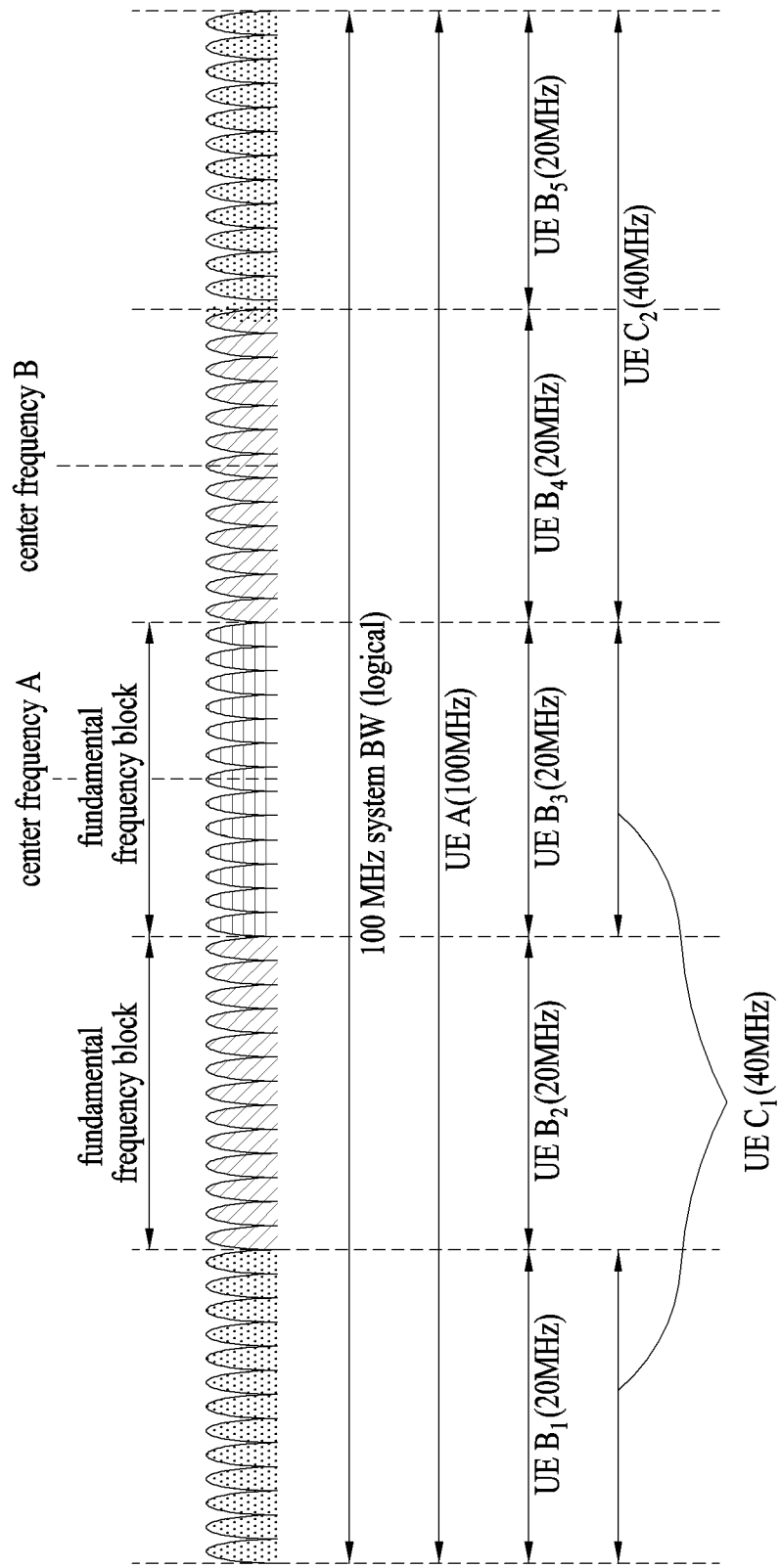
FIG. 6 is a conceptual diagram for explaining a carrier aggregation scheme.

In the following description, a carrier aggregation scheme is explained. FIG. 6 is a conceptual diagram for explaining a carrier aggregation scheme.

A carrier aggregation means a technology using one big logical frequency band in a manner that a user equipment uses a frequency block configured with an uplink resource (or a component carrier) and/or a downlink resource (or a component carrier) or a plurality of cells (of logical meaning) in order for a wireless communication system to use a wider frequency band. For clarity, a terminology of 'component carrier' is consistently used in the following description.

Referring to FIG. 6, a total system bandwidth (system BW) may have a system bandwidth up to maximum 100 MHz as a logical bandwidth. The total system bandwidth includes five component carriers and each of the component carriers may have up to maximum 20 MHz. The component carrier includes at least one physically contiguous subcarrier. Although each of the component carriers in FIG. 6 is depicted as including a bandwidth identical to each other, this is exemplary only. Each of the component carriers may be able to have a bandwidth different from each other. And, although each of the component carriers is depicted as it is adjacent to each other in frequency domain, since the diagram is depicted in terms of a logical concept, each of the component carriers may be physically adjacent to each other or may be apart from each other.

A center frequency can be differently used for each of the component carriers or a common center frequency can be used for the component carriers physically adjacent to each other. As an example, in FIG. 6, if assumed that all component carriers are physically adjacent to each other, a center frequency 'A' can be used. Or, if assumed that each of the component carriers is not physically adjacent to each other, such a separate center frequency as a center frequency 'A', a center frequency 'B' or the like can be used for each of the component carriers.

In the present specification, a component carrier may correspond to a system bandwidth of a legacy system. By defining the component carrier on the basis of the legacy system, it may become easy to provide backward compatibility and to design a system in a radio communication environment at which an evolved UE and a legacy UE coexist. As an example, in case that LTE-A system supports a carrier aggregation, each of the component carriers may correspond to a system bandwidth of LTE system. In this case, the component carrier may have a prescribed bandwidth among the bandwidths of 1.25 MHz, 2.5 MHz, 5 MHz, 10 MHz, or 20 MHz.

In case that a total system bandwidth is expanded by a carrier aggregation, a frequency band used for communicating with each UE is defined by a component carrier unit. A UE A may use 100 MHz corresponding to the total system bandwidth and performs a communication in a manner of using all of the five component carriers. A UE $B_1$~$B_5$ can use a bandwidth of 20 MHz only and performs a communication by using one component carrier. A UE $C_1$ and a UE $C_2$ can use a bandwidth of 40 MHz and performs a communication by using two component carriers, respectively. The two component carriers may or may not be logically/physically adjacent to each other. The UE $C_1$ indicates a case that the UE $C_1$ uses two component carriers not adjacent to each other and the UE $C_2$ indicates a case that the UE $C_2$ uses two component carriers adjacent to each other.

LTE system uses one DL component carrier and one UL component carrier. On the other hand, LTE-A system may use a plurality of component carriers as depicted in FIG. 6. In this case, a scheme of scheduling a data channel, which is scheduled by a control channel, can be divided into a conventional linked carrier scheduling scheme and a cross carrier scheduling scheme.

More specifically, in case of the linked carrier scheduling scheme, similar to a legacy LTE system using a single component carrier, a control channel transmitted on a specific component carrier schedules a data channel only via the specific component carrier.

Meanwhile, according to a cross carrier scheduling, a control channel transmitted on a primary component carrier (primary CC) schedules a data channel transmitted on the primary component carrier or a different component carrier using a carrier indicator field (CIF).

Figure 7:
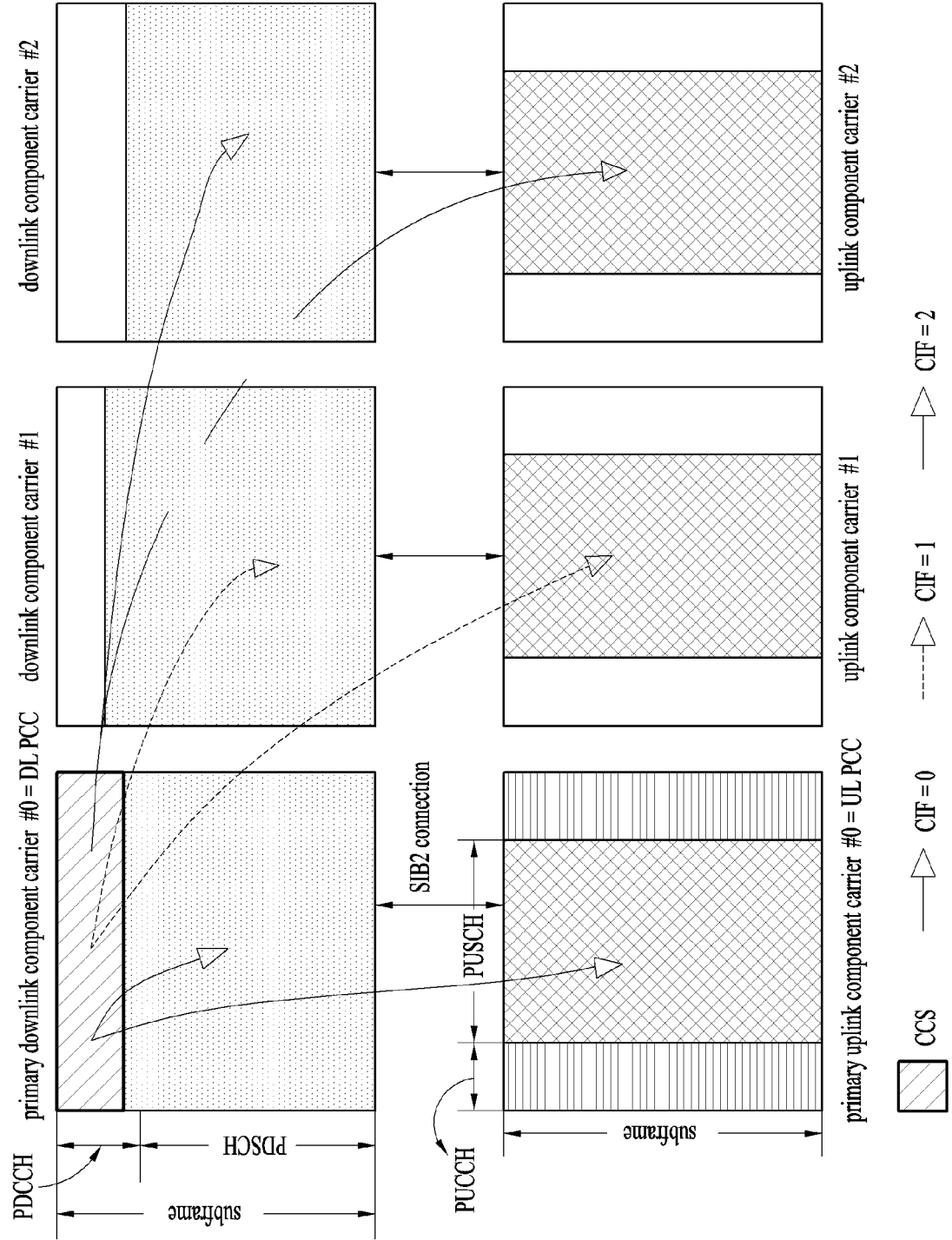
FIG. 7 is a diagram of an example to which a cross carrier scheduling scheme is applicable.

FIG. 7 is a diagram of an example to which a cross carrier scheduling scheme is applicable. In particular, the number of cell (or, a component carrier) assigned to a relay node corresponds to 3 in FIG. 7. As mentioned in the foregoing description, the cross carrier scheduling is performed using a CIF. In this case, assume that a DL cell (or, a component carrier) #A is a primary DL component carrier (i.e., a primary cell (PCell)) and a component carrier #B and a component carrier #C are secondary component carriers (i.e., secondary cell (Scell)).

Meanwhile, it is expected that a LTE-A system, which is a standard of a next generation mobile communication system, will support a CoMP (coordinated multi point) transmission scheme, which is not supported by the conventional standard, to enhance a data transfer rate. In this case, the CoMP transmission scheme is a transmission scheme for two or more eNode Bs or cells to communicate with the user equipment in a manner of cooperating with each other to enhance a communication performance between the user equipment situated at a radio shadow zone and the eNode B (a cell or a sector).

The CoMP transmission scheme can be classified into a join processing (COMP-joint processing, CoMP-JP) scheme of a cooperative MIMO form via data sharing and a coordinated scheduling/beamforming (CoMP-coordinated scheduling/beamforming, CoMP-CS/CB) scheme.

According to the joint processing (CoMP-JP) scheme in DL, a user equipment may be able to instantaneously receive data simultaneously from each of the eNode Bs performing the CoMP transmission scheme. And, a reception performance can be enhanced in a manner of combining signals received from each of the eNode Bs (joint transmission (JT)). And, it may be able to consider a method for one of the eNode Bs performing the CoMP transmission scheme to transmit data to the user equipment on a specific timing point (DPS; dynamic point selection). On the other hand, according to the coordinated scheduling/beamforming method (CoMP-CS/CB), the user equipment may be able to instantaneously receive data from a single eNode B, i.e., a serving eNode B, via a beamforming.

According to the joint processing (CoMP-JP) scheme in UL, each of the eNode Bs may be able to simultaneously receive PUSCH signal from the user equipment (joint reception (JR)). On the other hand, according to the coordinated scheduling/beamforming scheme (CoMP-CS/CB), only a single eNode B may be able to receive PUSCH. In this case, a decision on whether to use the coordinated scheduling/beamforming scheme is determined by the coordinating cells (or eNode Bs).

Meanwhile, the CoMP scheme is applicable to not only a homogenous network consisted of a macro eNB only but also a heterogeneous network.

Figure 8:
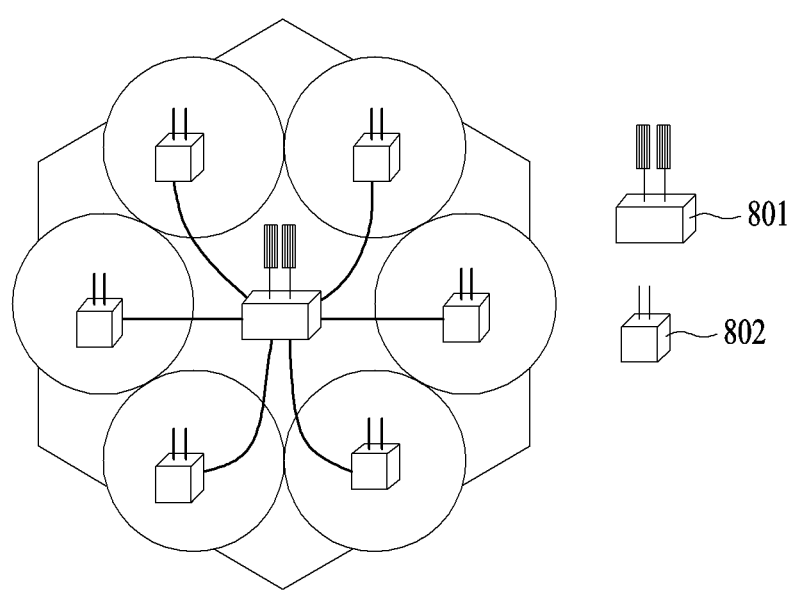
FIG. 8 is a diagram for an example of a structure of a heterogeneous network to which a CoMP scheme is applicable.

FIG. 8 is a diagram for an example of a structure of a heterogeneous network to which a CoMP scheme is applicable. In particular, FIG. 8 depicts a network consisted of RRHs (radio remote head) and the like 802 transceiving a signal with a macro eNB 801 with a relatively low transmit power. In this case, a pico eNB or the RRH positioned within coverage of the macro eNB can be connected to the macro eNB with an optical cable and the like. And, the RRH may be called a micro eNB.

Referring to FIG. 8, since transmit power of such a micro eNB as the RRH is relatively lower than the transmit power of a macro eNB, coverage of each RRH is relatively smaller than the coverage of the macro eNB.

Unlike a system at which a legacy macro eNB exist only, what a CoMP scenario intends to seek is to cover a coverage hole of a specific region via the RRHs added to a system or to increase a total system throughput via a cooperative transmission in a manner of utilizing a plurality of transmission points (TP) including the RRH and the macro eNB.

Meanwhile, in FIG. 8, the RRHs can be classified into two types. One type corresponds to a case that each of the RRHs receives a cell ID different from that of the macro eNB. Hence, each of the RHHs can be regarded as a small cell different from the macro eNB, respectively. Another type may correspond to a case that each of the RRHs operates in a manner of having a cell ID identical to that of the macro eNB.

In case that each of the RRHs and the macro eNB has a cell ID different from each other, a UE recognizes each of the RRHs and the macro eNB as an independent cell, respectively. In this case, the UE located at a boundary of each cell is severely interfered by a neighboring cell. In order to reduce the interference and to increase transfer rate, various kinds of CoMP schemes have been proposed.

Subsequently, in case that each of the RRHs and the macro eNB are provided with a cell ID identical to each other, as mentioned earlier, the UE recognizes each of the RRHs and the macro eNB as a single cell. The UE receives data from each of the RRHs and the macro eNB. In case of a data channel, a precoding, which is used to transmit data of each UE, is simultaneously applied to a reference signal as well. Hence, each UE can estimate a practical channel of its own on which the data is transmitted. In this case, the reference signal to which the precoding is applied corresponds to the aforementioned DM-RS.

While a single PDCCH is transmitted by a primary transmission point (PTP), the aforementioned CoMP scheme is considering a method of transmitting scheduling information of one or more secondary transmission points (STP) as well as scheduling information of the primary transmission point using the single PDCCH only.

Figure 9:
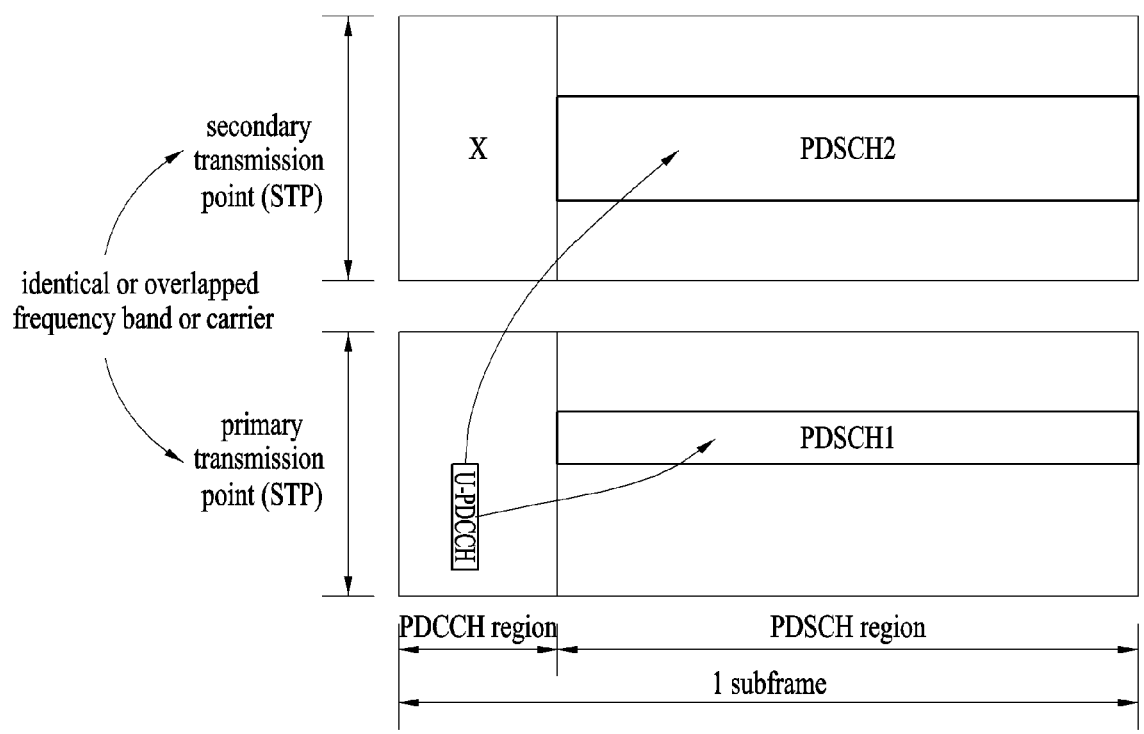
FIG. 9 is a diagram of an example that a downlink scheduling grant of a secondary transmission point is transmitted from a primary transmission point when a CoMP scheme is applied.

FIG. 9 is a diagram of an example that a downlink scheduling grant of a secondary transmission point is transmitted from a primary transmission point when a CoMP scheme is applied. In particular, FIG. 9 exemplifies a case that each transmission point transmits PDSCH via a single layer only.

Referring to FIG. 9, it is able to know that two PDSCHs (i.e., PDSCH 1 and PDSCH 2) are scheduled using a single PDCCH, i.e., a U-PDCCH (universal PDCCH), which is transmitted via a PDCCH region of a primary transmission point. Unlike a legacy PDCCH, it is preferable to design the U-PDCCH to enable the U-PDCCH to schedule two PDSCHs on an identical frequency band. In this case, although the U-PDCCH can be configured as identical to the legacy PDCCH, the U-PDCCH may have a format different from each other depending on an applied CoMP scheme.

The present invention proposes a method of transmitting multiple codewords or multiple transport blocks on a single carrier, which is transmitted by a plurality of cells (or transmission points) to a UE unable to apply a carrier aggregation scheme, i.e., the UE not having a carrier aggregation capability (may be called a legacy UE). In the following description, the aforementioned method is called a fake-CA.

According to a related art, a UE not having carrier aggregation capability was able to receive a single PDSCH on a single PDCCH. Yet, if the UE transmits multiple codewords or multiple transport blocks on a single carrier according to the fake-CA scheme, it is same as being capable of receiving a plurality of PDSCHs using a single PDCCH. Hence, UEs are able to receive a plurality of code words or transport blocks similar to the UE having an ability of carrier aggregation does although the UEs does not have the ability of the carrier aggregation.

In order to inform the UE not having carrier aggregation capability of whether the aforementioned operation is applied, a fake-CA (carrier aggregation) related signal should be added first. When the UE accesses a cell, the fake-CA related signal can be delivered to the UE in a UE capability negotiation process, prior to a UE capability report process, or in the middle of the processes.

As an example of the UE capability negotiation process or the UE capability report process, a UE can inform an eNB that the UE understands configurations of a plurality of cells but the UE is partly or absolutely not equipped with a function of simultaneously transmitting/receiving physical channels from a plurality of the cells and a function of transmitting/receiving a signal related to the physical channel transmission/reception. In this case, if the eNB delivers configuration information of a carrier aggregation scheme together with a fake-CA related signal to the UE not having carrier aggregation capability, the UE not having carrier aggregation capability can recognize that a parameter or a function related to the carrier aggregation scheme can be applied to the UE.

For instance, first of all, although the eNB sets a plurality of cells (i.e., a Pcell and an Scell) to the UE in a manner of applying the carrier aggregation scheme, the eNB can inform the UE that a specific DL physical channel or an UL physical channel is not transmitted to a prescribed cell in a manner of additionally transmitting a separate signal to the UE. As a different meaning, it may be comprehended that activation/ inactivation of each cell is configured according to a downlink and an uplink in a situation that the eNB has applied the carrier aggregation scheme.

More specifically, the eNB can inform the UE that PDSCH is not transmitted in a different cell except a specific cell (i.e., a PCell or a SCell) among the carrier aggregated cells. In this case, since the UE is able to ready to receive PDSCH in a designated cell only, the UE can perform a process identical to the process performed in a single cell operation while ignoring existence of the different cell.

And, it is able to simplify a UE implementation in a manner of omitting a process of decoding PDCCH required to receive PDSCH from a different cell. Hence, a field for a cross carrier scheduling is not necessary and even if the field exists, it is able to assume that the field is fixed in a specific state. Or, non-existence of the cross carrier scheduling field can be comprehended as a cross carrier scheduling is configured to semi-statically operate and it can also be comprehended as a cross carrier scheduling to a specific cell is always performed without a separate indicator. For this reason, although a user equipment decodes DL assignment information in a PCell, a PDSCH transmission for the DL assignment information is always performed in a Scell. In this case, the DL assignment information may maintain a format identical to the format of a case that a carrier aggregation scheme is not performed.

As a different example, the eNB can inform that a PUSCH transmission is not scheduled in different cells except a specific cell (i.e., a PCell or a SCell) among the configured cells. Additionally, the eNB may inform that a PUCCH or an SRS is not scheduled as well. In this case, similar to a situation of a legacy carrier aggregation scheme, it is able to configure ACK/NACK for the PDSCH always to be transmitted to the PCell.

Whether the aforementioned specific cell could schedule PDSCH/PUSCH may be independently configured according to each cell for DL and UL.

For instance, according to the carrier aggregation scheme, if PDSCH is received from a PCell or a SCell, originally, there exists a mechanism that PUCCH is transmitted to the PCell only. Yet, if a UE not having a carrier aggregation capability receives a fake-CA related signal, the UE can recognize that the UE can perform a different operation or the UE may perform a predetermined different operation.

In this case, as an example of the predetermined different operation, the UE not having a carrier aggregation capability receives PDSCH from a PCell and transmits PUCCH to a SCell. In particular, a combination of 'DL carrier+UL carrier' is configured by 'PCell (DL)+SCell (UL)'.

Figure 10:
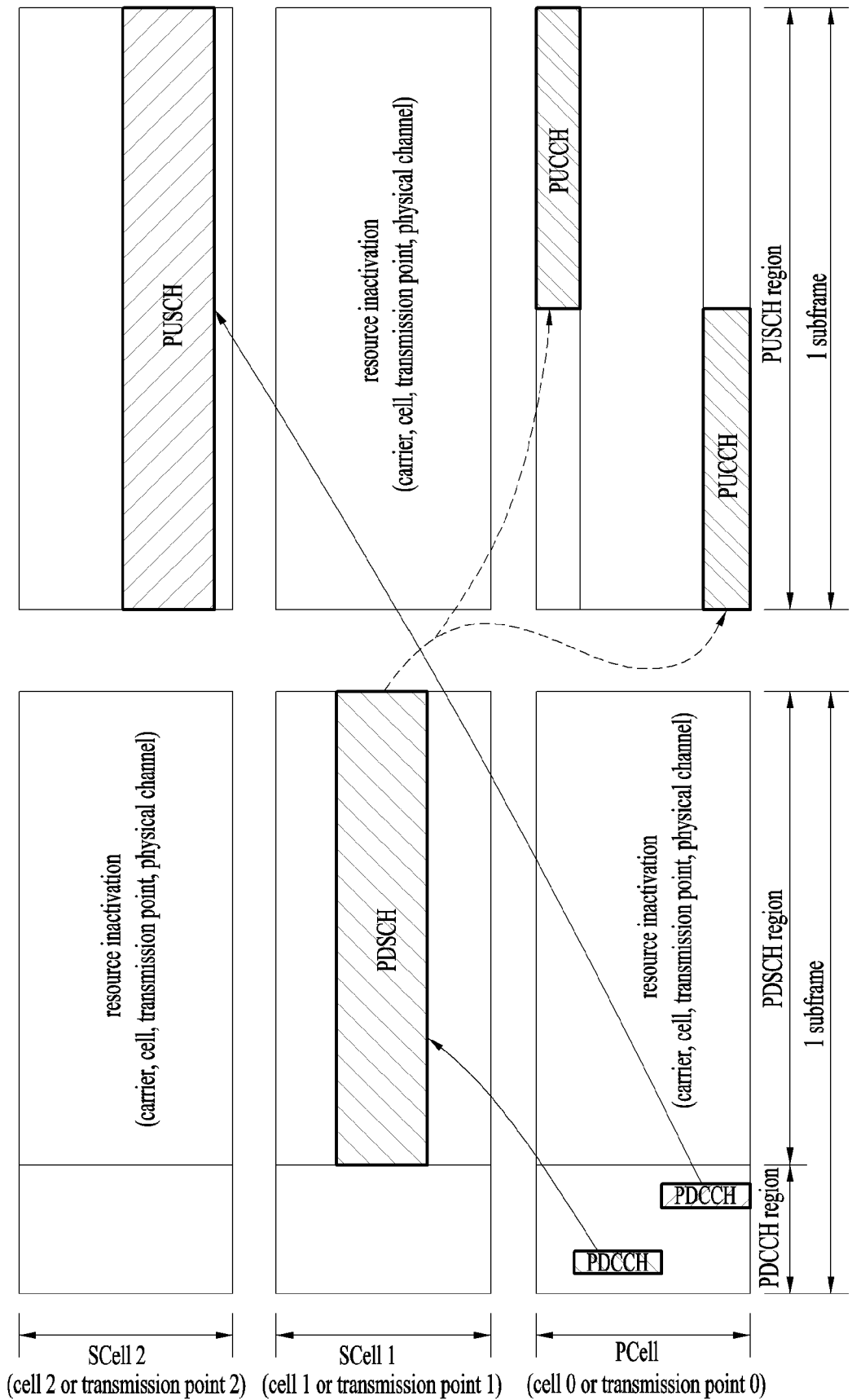
FIG. 10 is a diagram for an example that an independent downlink and uplink configuration according to a cell is applied to a UE not having carrier aggregation capability according to embodiment of the present invention.

FIG. 10 is a diagram for an example that an independent downlink and uplink configuration according to a cell is applied to a UE not having carrier aggregation capability according to embodiment of the present invention.

If two cells are configured, the aforementioned example is naturally and implicitly configured for the cells. Yet, if a plurality of cells exists, various combinations (e.g., 'PCell (DL)+SCell #2 (UL)') should be designated in advance. Hence, in order to support a more flexible configuration, it is able to inform a combination of a DL cell (carrier) and a UL cell (carrier), i.e., carrier combination indicator information via such an upper layer signal as an RRC signal.

Although this operation can be configured to be valid only when the UE not having carrier aggregation capability receives a signal, it is also able to make a UE having carrier aggregation capability perform the operation by adding a function of configuring each carrier with a combination of a prescribed DL and UL in a manner of modifying a legacy carrier aggregation scheme.

Moreover, in a situation that a UE operates a DL and an UL in a PCell by initially accessing via the UL of the PCell, an eNB can indicate the corresponding UE to operate the UL in a different specific cell (e.g., SCell) by transmitting a separate signal to the UE.

As mentioned in foregoing description, a DL cell and a UL cell operated by the UE may have a cell ID different from each other. In this case, it is necessary to readjust an operation using an implicit relationship between a DL and an UL. For instance, in general, the UE obtains a subframe synchronization based on a DL signal and then configures an UL transmission timing based on the subframe synchronization. Yet, if the UE uses a PCell only in DL and uses a SCell only in UL, it is necessary to newly regulate an appropriate operation.

For instance, an eNB can inform that a UE is able to assume a fact that a SCell is synchronized with a PCell. Or, if a UE detects a SCell DL signal to perform an RRM (radio resource management) of a neighboring cell, the UE can estimate a SCell UL timing from the corresponding SCell DL signal. In this case, the UE can also obtain pathloss measurement for an UL power control from the estimated SCell DL signal.

The fake-CA related signal can consist of a single signal and the signal can be configured in relation to a different operation capable of being subsequently occurred. For instance, the fake-CA related signal and the carrier combination indicator information can be managed in an integrated signal form.

Meanwhile, although a codeword, a transport block, PDSCH, and the like have inherited a concept of 3GPP LTE and LTE-A, meaning of them can be comprehended as such a general data transmission as a transmission packet. And, although a transmission point has inherited 3GPP CoMP scheme, as mentioned in the foregoing description, the transmission point can be comprehended as a cell. The transmission point may be comprehended as a component carrier, an RRH, and a relay node as well.

Figure 11:
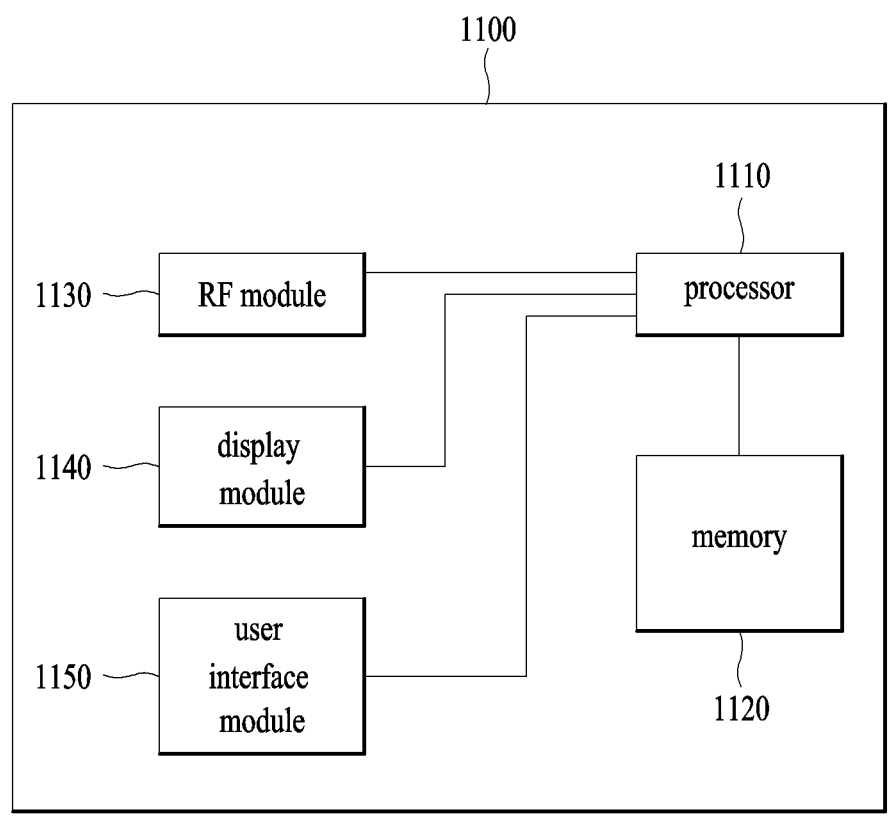
FIG. 11 is a block diagram of an example for a communication device according to one embodiment of the present invention.

FIG. 11 is a block diagram of an example for a communication device according to one embodiment of the present invention.

Referring to FIG. 11, a communication device 1100 may include a processor 1110, a memory 1120, an RF module 1130, a display module 1140, and a user interface module 1150.

Since the communication device 1100 is depicted for clarity of description, prescribed module(s) may be omitted in part. The communication device 1100 may further include necessary module(s). And, a prescribed module of the communication device 1100 may be divided into subdivided modules. A processor 1110 is configured to perform an operation according to the embodiments of the present invention illustrated with reference to drawings. In particular, the detailed operation of the processor 1110 may refer to the former contents described with reference to FIG. 1 to FIG. 10.

The memory 1120 is connected with the processor 1110 and stores an operating system, applications, program codes, data, and the like. The RF module 1130 is connected with the processor 1110 and then performs a function of converting a baseband signal to a radio signal or a function of converting a radio signal to a baseband signal. To this end, the RF module 1130 performs an analog conversion, amplification, a filtering, and a frequency up conversion, or performs processes inverse to the former processes. The display module 1140 is connected with the processor 1110 and displays various kinds of informations. And, the display module 1140 can be implemented using such a well-known component as an LCD (liquid crystal display), an LED (light emitting diode), an OLED (organic light emitting diode) display and the like, by which the present invention may be non-limited. The user interface module 1150 is connected with the processor 1110 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In the present specification, embodiments of the present invention are mainly explained centering on the data transmission and reception between a relay node and an eNode B. In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting/receiving a signal, which is transmitted/received by a user equipment in an eNode B coordination wireless communication system and an apparatus therefor are described with reference to examples applied to 3GPP LTE system, it may be applicable to various kinds of wireless communication systems as well as the 3GPP LTE system.

What is claimed is:

1. A method of transceiving a signal with a plurality of transmission points, at a user equipment in a wireless communication system, the method comprising:
   receiving carrier aggregation (CA) configuration information and a fake-CA related signal from a primary transmission point among a plurality of the transmission points; and
   transceiving a signal with each of a plurality of the transmission points via a single carrier according to information contained in the fake-CA related signal,
   wherein the information contained in the fake-CA related signal comprises information on whether an uplink and a downlink of each of a plurality of the transmission points are activated, and
   wherein the user equipment is unable to simultaneously transceive a signal with the plurality of the transmission points.

2. The method according to 1, wherein the fake-CA related signal comprises information indicating that a downlink signal is not transmitted in different transmission points except a specific transmission point among the plurality of the transmission points.

3. The method according to 1, wherein the fake-CA related signal comprises information indicating that an uplink signal transmission is not scheduled in different transmission points except a specific transmission point among the plurality of the transmission points.

4. The method according to 3, if the specific transmission point corresponds to a neighboring cell, further comprising estimating a timing synchronization to transmit an uplink signal to the neighboring cell using a downlink signal received from the neighboring cell to perform RRM (radio resource management).

5. The method according to 1, wherein the fake-CA related signal is received via an upper layer signaling.

6. A user equipment in a wireless communication system, the user equipment comprising:
   a radio communication module configured to transceiver a signal with a plurality of transmission points; and
   a processor configured to:
     process the signal,
     receive carrier aggregation (CA) configuration information and a fake-CA related signal from a primary transmission point among a plurality of the transmission points, and
     control the radio communication module to transceive a signal with each of a plurality of the transmission points via a single carrier according to information contained in the fake-CA related signal,
   wherein the information contained in the fake-CA related signal comprises information on whether an uplink and a downlink of each of a plurality of the transmission points are activated, and
   wherein the user equipment is unable to simultaneously transceive a signal with a plurality of the transmission points.

7. The user equipment according to claim 6, wherein the fake-CA related signal comprises information indicating that a downlink signal is not transmitted in different transmission points except a specific transmission point among the plurality of the transmission points.

8. The user equipment according to claim 6, wherein the fake-CA related signal comprises information indicating that an uplink signal transmission is not scheduled in different transmission points except a specific transmission point among the plurality of the transmission points.

9. The user equipment according to claim 8, wherein if the specific transmission point corresponds to a neighboring cell, the processor is configured to estimate a timing synchronization to transmit an uplink signal to the neighboring cell using a downlink signal received from the neighboring cell to perform RRM (radio resource management).

10. The user equipment according to claim 6, wherein the fake-CA related signal is received via an upper layer signaling.

* * * * *